Oct. 2, 1945.                  F. H. OWENS                     2,385,840
                    PROGRAM PRESELECTING AND CONTROL APPARATUS
                         Filed Nov. 23, 1942        5 Sheets-Sheet 1

INVENTOR
FREEMAN H. OWENS
BY
ATTORNEY

Oct. 2, 1945.                F. H. OWENS                2,385,840
        PROGRAM PRESELECTING AND CONTROL APPARATUS
          Filed Nov. 23, 1942            5 Sheets-Sheet 2
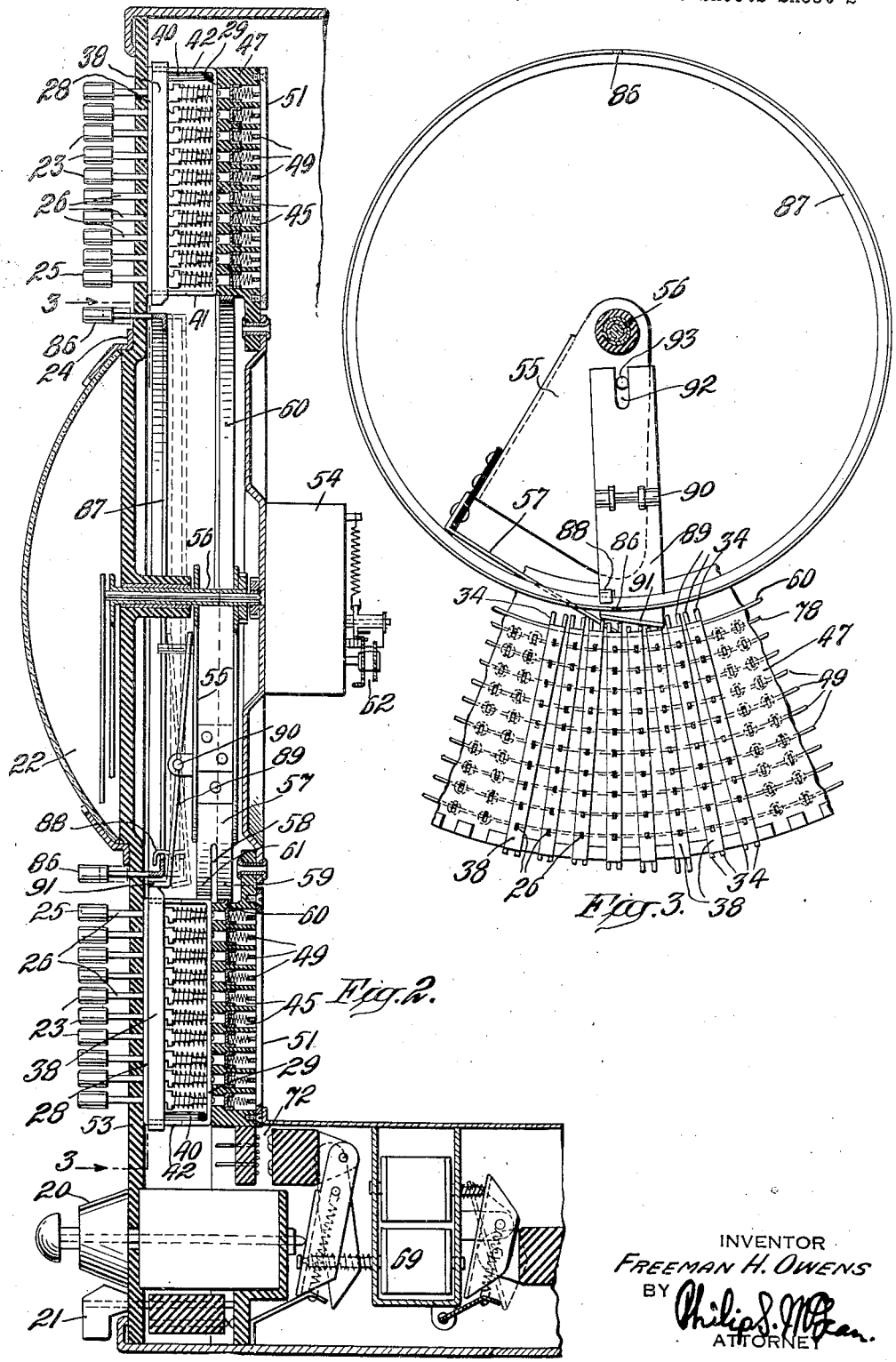
INVENTOR
FREEMAN H. OWENS
BY
ATTORNEY Oct. 2, 1945. F. H. OWENS 2,385,840
PROGRAM PRESELECTING AND CONTROL APPARATUS
Filed Nov. 23, 1942 5 Sheets-Sheet 3
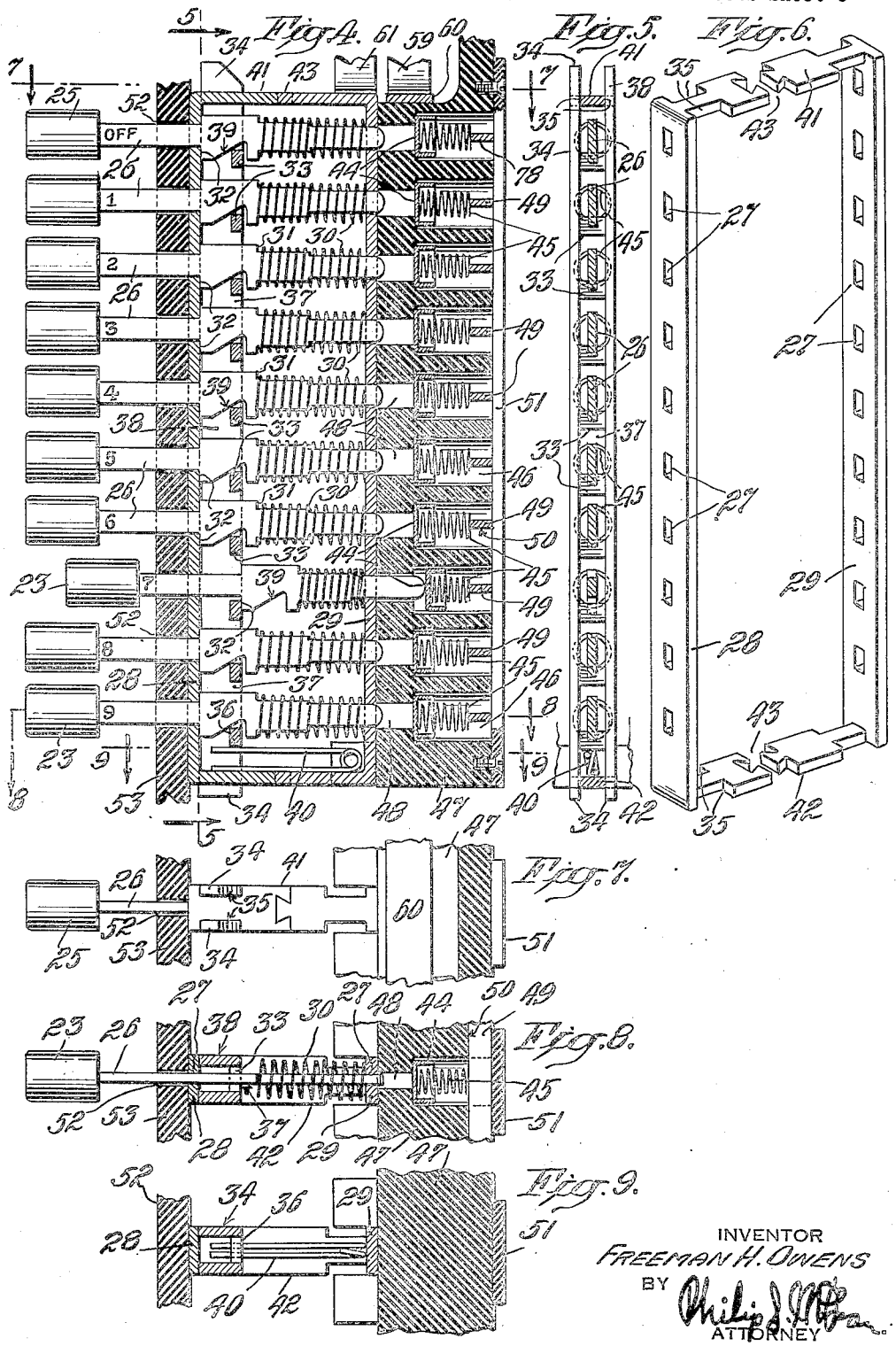
INVENTOR
FREEMAN H. OWENS
BY Philip J. ...
ATTORNEY

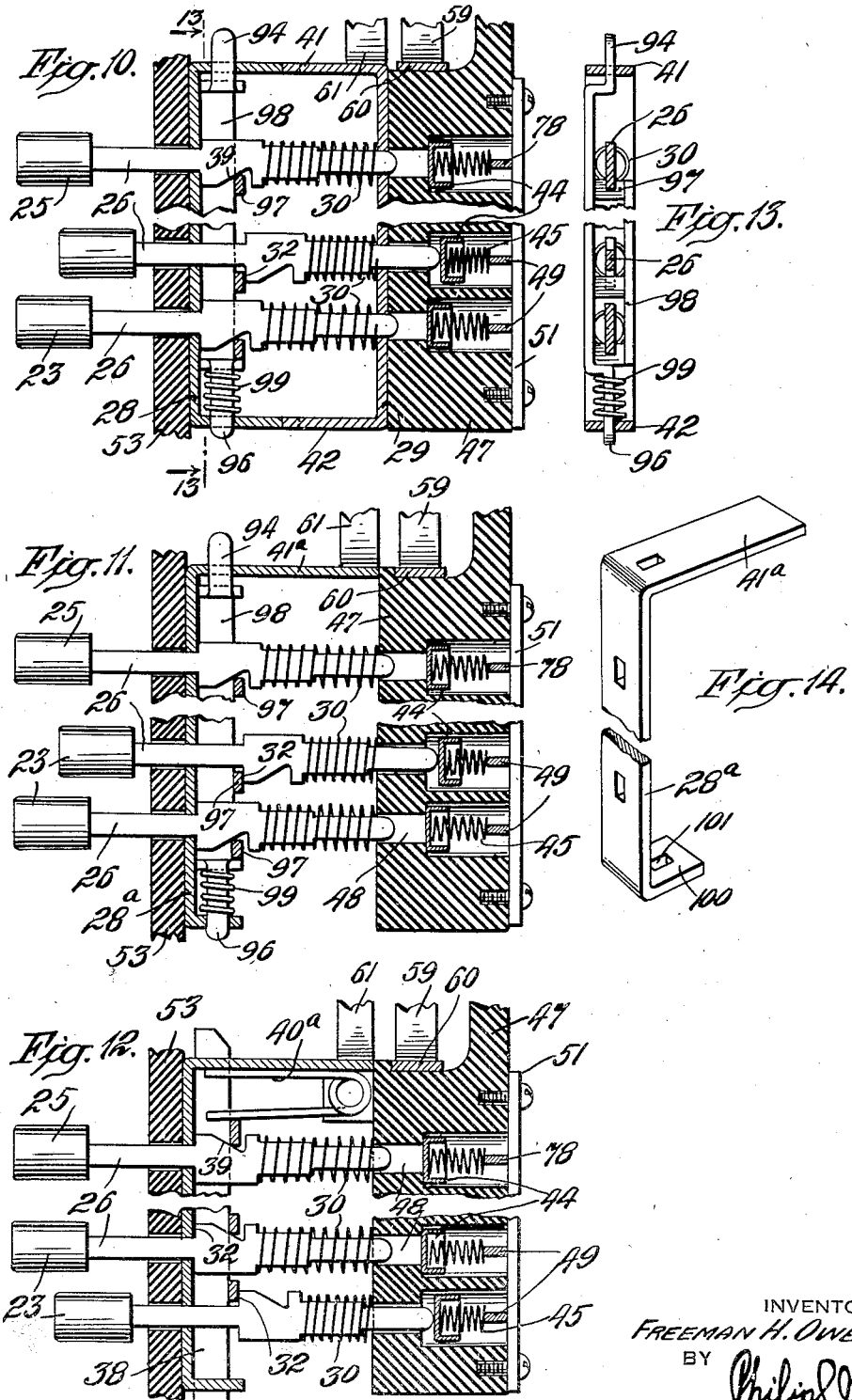

Oct. 2, 1945.   F. H. OWENS   2,385,840
PROGRAM PRESELECTING AND CONTROL APPARATUS
Filed Nov. 23, 1942   5 Sheets-Sheet 5

INVENTOR
FREEMAN H. OWENS
BY
ATTORNEY

Patented Oct. 2, 1945

2,385,840

UNITED STATES PATENT OFFICE 2,385,840

PROGRAM PRESELECTING AND CONTROL APPARATUS

Freeman H. Owens, New York, N. Y.

Application November 23, 1942, Serial No. 466,686

17 Claims. (Cl. 161—1)

The herein disclosed invention relates to apparatus for preselecting desired programs or sequences and is a continuation in part of inventions disclosed and covered in copending patent applications Ser. No. 397,504, filed June 10, 1941, now Patent No. 2,337,568, Ser. No. 450,449, filed July 10, 1942, and Ser. No. 465,155, filed November 10, 1942.

Special objects of the invention are to provide the apparatus in a particularly compact, simple and easily understandable organization, to provide the program selecting time switches in a balanced symmetrical arrangement grouped about the clock where they can be quickly and easily located for the purpose of setting up a desired program; to eliminate wiring, so far as possible and arrange the parts so that necessary connections will be made by the simple act of assembly; to provide the selecting switches in simple structural units, which can be made up and handled as such in the manufacture and assemblage of the apparatus and in general, to simplify, improve and reduce the cost of devices of the type under consideration.

One particular purpose of the invention is to provide in conjunction with the program selecting devices, a means by which, when desired, all the setting devices will be automatically released and restored to an inactive relation, after a particular selected program has been completed.

Other desirable objects will appear as the specification proceeds.

The novel features and combinations through which the purposes of the invention are attained are set forth in the following specification, broadly covered in the claims and illustrated by way of practical example in the accompanying drawings. It is realized however, that actual physical structure may be modified and changed in various ways all within the true spirit and broad scope of the invention. The illustration therefore is to be considered primarily for purposes of disclosure and not by way of limitation, the actual scope of the invention being as hereinafter broadly defined and claimed.

Fig. 2 is an enlarged broken vertical sectional view on substantially the plane of line 2—2 of Fig. 1.

Fig. 3 is a fragmentary part sectional view as on substantially the line 3—3 of Fig. 2, showing particularly the distributor brush and the cam for clearing the program setting keys.

Fig. 4 is an enlarged broken sectional detail of one of the push button key units, as mounted in the machine.

Fig. 5 is a vertical sectional view as on line 5—5 of Fig. 4.

Fig. 6 is a perspective view of the two-part sectional frame of the key unit.

Figs. 7, 8 and 9 are horizontal sectional views as on lines 7—7, 8—8 and 9—9 of Fig. 4.

Figs. 10, 11 and 12 are fragmentary sectional views of other forms of push button units.

Fig. 13 is a vertical sectional view on substantially the plane of line 13—13 of Fig. 10.

Fig. 14 is a broken perspective view of the one-piece frame employed in the Fig. 11 form of construction.

Figure 15:
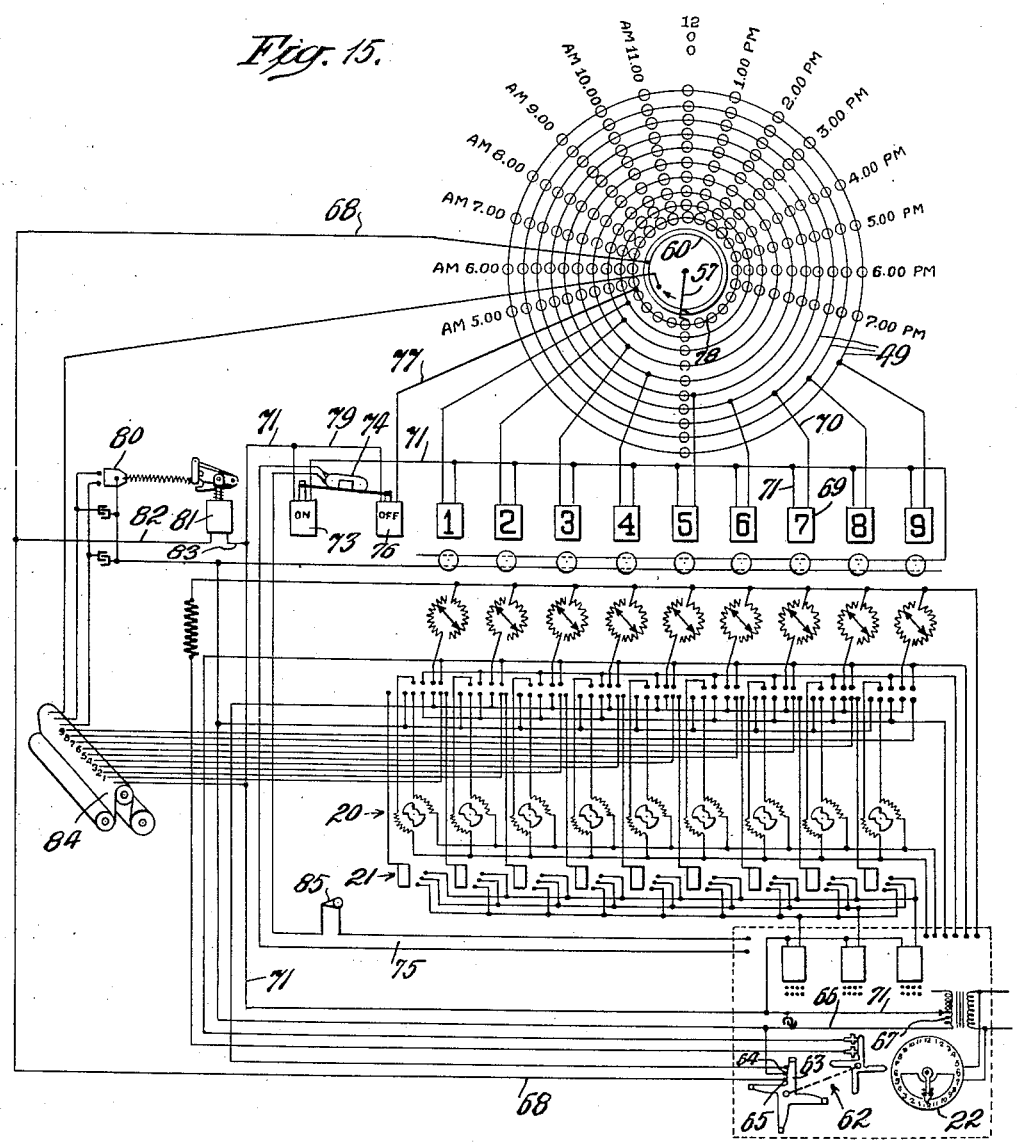

Fig. 15 is a wiring diagram.

In the present disclosure, the invention is shown applied to the control of radio programs.

Figure 1:
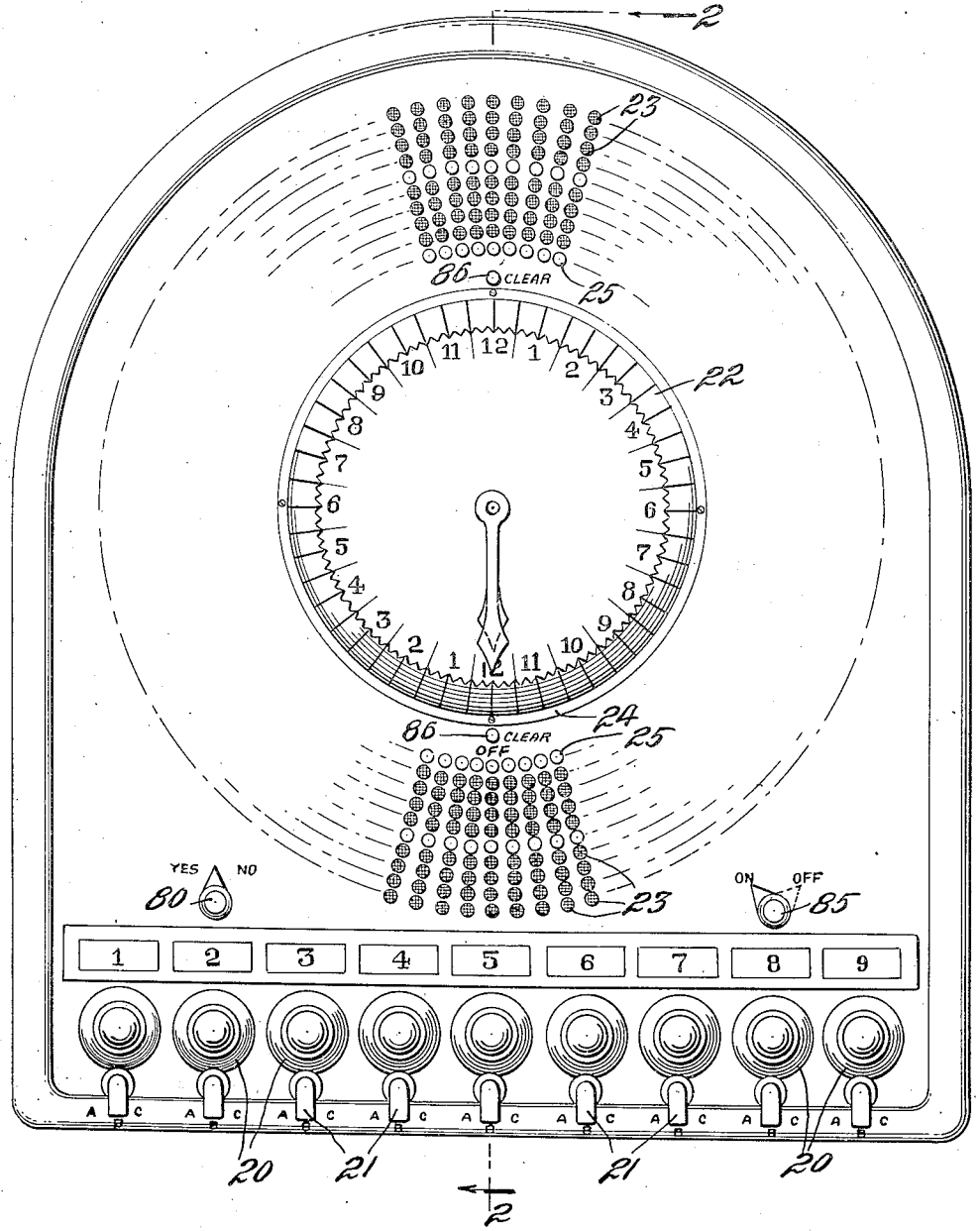
Fig. 1 is a front elevation of a present embodiment of the invention.

The radio receiver shown in Fig. 1, comprises nine different tuners numbered 1 to 9, and equipped each with a tuning knob 20, and a wave band selecting switch 21, having three positions designated A, B and C. A twenty-four hour clock 22, is located above the tuners, substantially centrally of the front panel and the program selectors in the form of push button switches 23, are grouped about the clock in radially extending rows lined up with the time indications 24, on the clock dial.

In the illustration, there are ten buttons in each row, one for each of the nine different tuners and an extra button 25, at the inner end of the row for an "off" switch. For illustrative purposes, the usual fifteen minute broadcast period may be considered the basis for the time changes and accordingly, there is shown one radially extending row of station selecting and "off" buttons for each fifteen minute interval.

The push button switches are shown in Fig. 4 as comprising each a reciprocating flat slide 26, operating in guide openings 27, in the front and back bars 28, 29, of a frame which mounts an entire set of the ten buttons. Springs 30, between the back bar 29, and shoulders 31, on the slides, project the slides to the extent permitted by engagement of the forward shoulders 32, with the inside of the front bar 28. These same shoulders, when engaged by the latch bar 33, serve for holding the plungers inward in the switch closed position—note the number 7 button in Fig. 4.

The latch bar 33, is shown as substantially U-shaped in cross-section, providing parallel side bars 34, arranged to slide in guide notches 35, in the upper and lower bars of the frame directly in back of the front bar 28, and connected by a wall or web 36, having openings 37, cut through for passage of the slides and to provide the cross bars 38, for engagement with the shoulders 32. Inclines 39, on the lower edges of the plungers ride over these cross bars to depress the latch bar against the lifting effect of the hairpin spring 40, seated on the bottom bar of the frame.

The top and bottom bars 41, 42 of the frame are shown sectioned and the sections connected by dovetail joints 43, Fig. 6, to enable easy assembly of the slides, latch bar and springs.

The actual closing of circuit is effected in each case by the inner end of a push button slide coming into engagement with a contact cup or thimble 44, supported by a spring 45, in a guide hole 46, in the back of an insulating panel 47, said panel having communicating openings 48, at the front to admit the ends of said slides.

The contact supporting springs 45, are in turn backed up and supported by the ten concentrically disposed bus bar rings 49, set in slots 50, in the back of the panel and held by retainer strips 51, of insulating material.

The push buttons may be screwed or otherwise removably engaged on the ends of the slides to permit assembly of the switch units by passing the shanks of the slides through openings 52, in the front panel 53, after which the buttons can be applied. After assembling the yielding switch contacts 44, springs 45 and bus rings 49, in the back panel and securing these parts by the retainer strips 51, the entire back panel assembly can be attached to the front panel to clamp all the push button assemblies in place.

Timing is effected in the illustration by a distributor brush operated from the time clock to successively engage the push button frames, representing each a particular time and by a rotary timing switch. Both distributor brush and rotary switch are driven from the time clock which, as shown in Fig. 2, may comprise a constant speed clock motor 54, having a radial arm or arms 55, on the hour hand sleeve 56, carrying an insulating tangentially extending spring brush 57, split at 58, Fig. 2, to provide one branch 59, riding a current supply ring 60, and a second branch 61, to snap from the end 41, of one key frame onto the next.

In this manner, each key frame is connected in circuit with the current supply ring, preferably a short interval before the time that particular key frame represents, thus to place all ten of the switches in that bank in readiness to close a circuit at the instant that time is actually reached. The rotary timer provides the means for completing the circuit at the actual time instant. This accurate timing rotary switch is indicated only in a general way at 62, in the present disclosure, the same being disclosed and fully covered in prior applications first above referred to.

The arrangement of all ten selecting keys for each particular time in a single straight row lined up radially with that time indication on the clock dial, enables these keys to be immediately identified and selected directly from the clock dial. The individual keys or buttons in a row may be marked to identify the stations or the tuners, from 1 to 9, which they control, or some such indications may be provided on the panel alongside such keys. Also the buttons may be differently colored to facilitate quick selection of different stations.

The nine tuners, with their wave band selecting switches having been properly adjusted to bring in different desired stations, it is only necessary then, to set up a program, to pick out the rows representing the particular time periods and to push the button in each of those rows representing the station which it is desired to hear in that special time period. The operation of this button in each row releases any previously operated button and locks the last button in, as the button for the number 7 station in Fig. 4. Then when the branch 61, of the distributor brush contacts this particular time frame, as indicated in Fig. 4, the number 7 bus ring 49, at the back of the depressed key will be connected in circuit with the common supply ring 60.

This circuit may be followed further in the wiring diagram Fig. 15, wherein the rotary timing switch 62, is shown as having radial arms 63, which at one point in their rotary movement momentarily connect contacts 64, 65, to send current through wiring 66, from one side of the power transformer 67, and by wiring 68, to supply ring 60, current flow then continuing across the branches 59, 61, of the distributor brush 57, to the top bar 41, of the button frame and from the depressed button slide 26, to the engaged contact 44, and through spring 45 to bus ring 49. If this be the number 7 bus ring, as in Fig. 4, a solenoid 69, Figs. 2 and 15, connected by wiring 70, with that bus ring will be energized, the necessary return connections including wiring 71, back to the other side of current source 67.

Solenoid 69 thus energized operates a circuit closer 72, for the particular circuits necessary for that tuner, details of these features being unnecessary to consider here, because of the full disclosure and coverage of same in copending patent applications referred to.

Included in the return connections 71, indicated in Fig. 15, there is shown an "on" magnet 73, which thus for each station selecting action is energized to throw or to hold the rocking mercury switch 74, in position, closing a main supply circuit 75, through the radio section of the apparatus.

A reverse acting "off" magnet 76, is shown connected by wiring 77, with the innermost "off" bus ring 78, and by connection 79, in the return side 71, of the control circuit, so that if the "off" button 26, of the row is in at the time the circuit is closed, mercury switch 74, will be swung to open the radio supply circuit and the radio will therefore remain off for that particular period.

If it is desired to include recording mechanism in the apparatus, as disclosed in above identified applications, a "yes" and "no" voting turnbutton may be provided as indicated at 80, Figs. 1 and 15, and a so-called fifteen minute solenoid 81, will be connected across the control circuit 66, 71, at 82, 83, to release the voting button from the position to which it has been turned, at the end of each broadcast or other predetermined period.

The record strip is indicated generally at 84, Fig. 15 and also in this view the "on" and "off" switch is indicated at 85, connected across the radio supply circuit 75.

If the same program is to be continued day after day, the selector buttons may be left as placed. If, on the other hand, it is desired to discontinue the automatic program selection, after going through a predetermined sequence, all selecting switches may be automatically cleared, after having served their purpose by means shown in Figs. 1, 2 and 3, as consisting of the clearing buttons 86, projecting through the front of the panel and connected at the back with a ring 87, engaged by the hook 88, of a cam lever 89, pivoted at 90, on the rotating brush arm 55, and having the inclined cam flange 91, to engage the inclined upper ends of the latch side bars 34. The inner end of the swinging cam lever is shown in Fig. 3, slotted at 92, to engage over and be steadied by the pin 93, projecting from the brush arm.

In Fig. 2, the clearing buttons 86, are shown in full lines pulled out to locate the ring 87, as a circular track holding the lower cam end 91, of the trip lever outward or forward in position to engage and force out the latch bars, thus to release any and all previously actuated push buttons, in one complete rotation of the cam. It will be noted in Fig. 3, that this cam is located behind the distributor brush, the direction of rotation considered so as to release the switch buttons only after they have served their purpose in determining the program selection.

When it is desired to leave the selector keys in the program selecting positions to which they may have been set, the clearing buttons 86, are pushed in to the dotted line positions, Fig. 2, thus to force back the cam lever 89, to a place where it will not touch the ends of the latch bars in its rotary movement on the distributor arm.

In Figs. 10 and 13, a modified form of latch is illustrated, consisting of a flat bar 94, having laterally offset ends 95, 96, slidingly guided in openings in the upper and lower bars 61, 62, of the frame and having transversely extending elements 97, for cooperation with the cams and locking shoulders of the push button slides. These locking elements are shown connected by a second side bar 98, to keep them parallel in the nature of the rungs of a ladder. A coiled spring 99, is shown engaged beneath the offset at the lower end of the latch slide to yieldingly support said slide, raised in active cooperation with the button slides.

Figs. 11 and 14, illustrate a modification in the frame construction, in which the frame is a single L-shaped piece having only a top bar 61a, a front bar 20a, and a rearwardly struck lug 100, at the bottom only long enough to carry the lower guide opening 101, for the latch slide.

Fig. 12 illustrates a parallel-sided form of latch like that first disclosed but tensioned by a hairpin spring 99a, to act downwardly instead of upwardly and the button slides as having cams and locking shoulders at their upper instead of at their lower edges.

While particularly useful for radio program selecting purposes, the invention is adapted for presetting and controlling practically any kind of program sequences whether mechanical, electrical, chemical or otherwise and whether it be completely or only partly automatic. And while probably preferable to arrange the selector keys in radial rows lined up with the markings of the time clock, it is contemplated that other arrangements might prove preferable for certain specific purposes. Thus the rows of switch buttons might be grouped side-by-side in a single bank or in several different banks or blocks, possibly in some other particular or significant relation to the time clock. Instead of covering a whole twenty-four hour period, the selecting time keys or buttons might be arranged to cover a lesser or greater total period.

The various parts of the apparatus are relatively simple, particularly those which are more numerous and all parts are easily assembled. Also they are so constructed and arranged that the mere act of associating and putting them together places them in circuit cooperative relation, eliminating need for any wiring, except that required for connecting the switch closing magnets and related parts in circuit.

What is claimed is:

1. Program preselecting and control apparatus, comprising a time clock, a rotary arm operated by said time clock, a cam lever shiftably mounted on said arm, selector switches grouped about said rotating arm, latch bars for holding said switches and positioned for release by said cam lever and means for shifting said cam lever from a latch releasing to a non-latch releasing position and vice versa, said means being operable at any time and effective to shift said cam lever one way or the other, irrespective of the rotary movement of the arm carrying said cam lever.

2. Apparatus of the character disclosed, comprising a time clock, bus rings grouped concentrically about said time clock, push button switches in line and cooperative with the respective bus rings, means operated by said time clock for making successive electrical connection with said switches, said switches including push button slides, contacts engageable by said slides, springs bearing on said bus rings and yieldingly supporting said contacts in position for engagement by said slides and means for guiding and limiting the movement of said spring supported contacts toward said push button slides.

3. Program preselecting and control apparatus, comprising a panel having rows of passages in the back of the same and grooves crossing the outer ends of said passages, cupped contacts loosely guided in said passages, springs at the back of said contacts, bus bars set in said grooves and engaging said springs to confine said springs and contacts in said passages, push buttons guided in front of said passages and engageable with said contacts and electrical connections to said push buttons and to said bus bars, including a rotary circuit closer and a time clock for operating the same, the push buttons for each row of passages having a common terminal contact and said terminal contacts being disposed in a circular series, successively engageable by said rotary circuit closer.

4. Program preselecting and control apparatus, comprising a panel having rows of passages in the back of the same and grooves crossing the outer ends of said passages, cupped contacts loosely guided in said passages, springs at the back of said contacts, bus bars set in said grooves and engaging said springs to confine said springs and contacts in said passages, push buttons guided in front of said passages and engageable with said contacts and electrical connections to said push buttons and to said bus bars, said push buttons standing in rows corresponding to the rows of passages, a separate frame for each row of push buttons, the frame for each row of push buttons forming a common electrical connection for all the push buttons in that row, a rotary contactor for successive engagement with the common electrical connection with each of said rows, a time clock for operating said contactor and means for holding in one push button in a row and for releasing any previously actuated push button in such row.

5. Program preselecting and control apparatus, comprising a time clock, a rotating contactor operated thereby, radially extending rows of push button elements, said rows being insulated from each other but the push button elements of each row having a common terminal contact, said contacts being circularly disposed and in position to be successively engaged by said rotary contactor, bus rings at the back of said push button elements insulated from each other and disposed in cooperative relation with the individual push button elements in said rows and electrical connections for completing circuits with bus bars selected by individual push buttons in said rows when said circuit closer in its rotary movement comes into cooperative engagement with the terminal contacts of the rows in which said selected push button elements are located.

6. Program preselecting and control apparatus, comprising a time clock, a rotating contactor operated thereby, radially extending rows of push button elements, said rows being insulated from each other but the push button elements of each row having a common terminal contact, said contacts being circularly disposed and in position to be successively engaged by said rotary contactor, bus rings at the back of said push button elements insulated from each other and disposed in cooperative relation with the individual push button elements in said rows and electrical connections for completing circuits with bus bars selected by individual push buttons in said rows when said circuit closer in its rotary movement comes into cooperative engagement with the terminal contacts of the rows in which said selected push button elements are located, said electrical connections including yielding contact members interposed between the individual push button elements and the bus rings at the back of the same.

7. Program preselecting and control apparatus, comprising a time clock, a rotating contactor operated thereby, radially extending rows of push button elements, said rows being insulated from each other but the push button elements of each row having a common terminal contact, said contacts being circularly disposed and in position to be successively engaged by said rotary contactor, bus rings at the back of said push button elements insulated from each other and disposed in cooperative relation with the individual push button elements in said rows and electrical connections for completing circuits with bus bars selected by individual push buttons in said rows when said circuit closer in its rotary movement comes into cooperative engagement with the terminal contacts of the rows in which said selected push button elements are located, interlocking means for holding any selected push button and for releasing any previously selected push button in a row and means at each row for releasing the interlocking means of that row for clearing all the push button elements in the row.

8. Program preselecting and control apparatus, comprising a time clock, a rotating contactor operated thereby, radially extending rows of push button elements, said rows being insulated from each other but the push button elements of each row having a common terminal contact, said contacts being circularly disposed and in position to be successively engaged by said rotary contactor, bus rings at the back of said push button elements insulated from each other and disposed in cooperative relation with the individual push button elements in said rows and electrical connections for completing circuits with bus bars selected by individual push buttons in said rows when said circuit closer in its rotary movement comes into cooperative engagement with the terminal contacts of the rows in which said selected push button elements are located, interlocking means for securing the push buttons selected in the several rows and means for releasing said interlocking means, said releasing means being shiftable from an inoperative to an operative position, whereby the program predetermined by said apparatus may be repeated or be automatically cleared.

9. Program preselecting and control apparatus, comprising a time clock, a rotating contactor operated thereby, radially extending rows of push button elements, said rows being insulated from each other but the push button elements of each row having a common terminal contact, said contacts being circularly disposed and in position to be successively engaged by said rotary contactor, bus rings at the back of said push button elements insulated from each other and disposed in cooperative relation with the individual push button elements in said rows and electrical connections for completing circuits with bus bars selected by individual push buttons in said rows when said circuit closer in its rotary movement comes into cooperative engagement with the terminal contacts of the rows in which said selected push button elements are located, interlocking slides for securing the push buttons selected in the rows, a member operated by said time clock for releasing said slides, said member being shiftable from an inactive to an active position to either leave said interlocking slides in a program repeating condition or to release the slides to clear the apparatus.

10. Program preselecting and control apparatus, comprising a time clock, a rotating contactor operated thereby, radially extending frames positioned for successive engagement by said rotating contactor, a group of push buttons in each frame and having said frame as a common electrical terminal, bus rings in electrically connectable relation with said push buttons and electrical circuit connections from said bus rings to said rotating contactor.

11. Program preselecting and control apparatus, comprising a time clock, a rotating contactor operated thereby, radially extending frames positioned for successive engagement by said rotating contactor, a group of push buttons in each frame and having said frame as a common electrical terminal, bus rings in electrically connectable relation with said push buttons, electrical circuit connections from said bus rings to said rotating contactor, a latch for the push buttons, slidingly mounted in each of said frames and having a projecting portion, a rotating arm operated by said time clock and a latch releasing member movably mounted on said arm and shiftable into position either to engage or to be free of said projecting portions of the latches in the rotation of said arm.

12. Program preselecting and control apparatus, comprising gangs of push buttons arranged in time signifying sequence, the push buttons in each gang being electrically connected and individually representing different broadcast stations or the like, a time clock, a distributor operated by said time clock to connect said gangs in circuit completing condition in step with passage of time, station identifying buses in position for cooperative relation with the individual push buttons of said gangs, and means operable by a selected push button to release a previously actuated button of a gang and leave the circuit set up by the last actuated push button, whereby at a selected time a previously selected bus will be automatically connected in circuit completing condition and control devices electrically connected with the respective buses.

13. Program preselecting and control apparatus, comprising gangs of push buttons arranged in time signifying sequence, the push buttons in each gang being electrically connected and individually representing different broadcast stations or the like, a time clock, a distributor operated by said time clock to connect said gangs in circuit completing condition in step with passage of time, station identifying buses in position for cooperative relation with the individual push buttons of said gangs, means operable by a selected push button to release a previously actuated button of a gang and leave the circuit set up by the last actuated push button, whereby at a selected time a previously selected bus will be automatically connected in circuit completing condition, control devices electrically connected with the respective buses and an "off" push button for each gang controlling and under control of said means, for either clearing all the buttons in a gang or for leaving in the button previously selected, for repetition of the program.

14. Program preselecting and control apparatus, comprising gangs of push buttons arranged in time signifying sequence, the push buttons in each gang being electrically connected and individually representing different broadcast stations or the like, a time clock, a distributor operated by said time clock to connect said gangs in circuit completing condition in step with passage of time, station identifying buses in position for cooperative relation with the individual push buttons of said gangs, means operable by a selected push button to release a previously actuated button of a gang and leave the circuit set up by the last actuated push button, whereby at a selected time a previously selected bus will be automatically connected in circuit completing condition, control devices electrically connected with the respective buses, an "off" push button for each gang controlling and under control of said means, for either clearing all the buttons in a gang or for leaving in the button previously selected, for repetition of the program, an "off" bus cooperatively related with the "off" buttons of said gangs and a circuit interrupter electrically connected with said "off" bus.

15. Program preselecting and control apparatus, comprising gangs of push buttons arranged in time signifying sequence, the push buttons in each gang being electrically connected and individually representing different broadcast stations or the like, a time clock, a distributor operated by said time clock to connect said gangs in circuit completing condition in step with passage of time, station identifying buses in position for cooperative relation with the individual push buttons of said gangs, means operable by a selected push button to release a previously actuated button of a gang and leave the circuit set up by the last actuated push button, whereby at a selected time a previously selected bus will be automatically connected in circuit completing condition, control devices electrically connected with the respective buses, a clearing device operated by said time clock and means for setting said clearing device to engage and release said means or to remain free of said means, to thereby clear all the push buttons or to leave the selected push buttons in set position to continue the same program.

16. Program preselecting and control apparatus, comprising rows of push buttons, each row representative of a particular time and each push button in a row representative of a particular broadcast station or the like, a time clock, a distributor operated thereby and arranged to electrically connect all the push buttons in a row at the time represented by a given row, buses in back of and arranged to be electrically connected with individual actuated push buttons in said rows, electric control means connected with said buses and interlocking means operable by a selected push button in a row for automatically clearing previously actuated push buttons in that row.

17. Program preselecting and control apparatus comprising a time clock, a rotating contactor operated thereby, rows of push button elements, said rows being insulated from each other but the push button elements of each row having a common terminal contact, said contacts being circularly disposed and in position for successive engagement by said rotary contactor, bus bars at the back of said push button elements insulated from each other and disposed in cooperative relation with the individual push button elements in said rows, and electrical connections for completing circuits with said bus bars selected by individual push buttons in said rows when said circuit closer in its rotary movement comes into cooperative engagement with the terminal contacts of the rows in which said selected push button elements are located.

FREEMAN H. OWENS.